(12) United States Patent
Kapoor

(10) Patent No.: US 12,112,776 B2
(45) Date of Patent: Oct. 8, 2024

(54) VIDEO EDITING

(71) Applicant: Whisper Holdings Pte Ltd., Singapore (SG)

(72) Inventor: Manav Singh Kapoor, Jakarta (ID)

(73) Assignee: WHISPER HOLDINGS PTE LTD., Singapore (SG)

( * ) Notice: Subject to any disclaimer, the term of this patent is extended or adjusted under 35 U.S.C. 154(b) by 0 days.

(21) Appl. No.: 17/446,867

(22) Filed: Sep. 3, 2021

(65) Prior Publication Data
US 2022/0076708 A1    Mar. 10, 2022

(30) Foreign Application Priority Data
Sep. 4, 2020   (GB) ..................................... 2013949

(51) Int. Cl.
*G06T 7/11*   (2017.01)
*G06V 20/40*   (2022.01)
*G11B 27/036*   (2006.01)

(52) U.S. Cl.
CPC ............ *G11B 27/036* (2013.01); *G06V 20/40* (2022.01)

(58) Field of Classification Search
CPC ............................ G11B 27/036; G06V 20/40
See application file for complete search history.

(56) References Cited

U.S. PATENT DOCUMENTS

| | | | |
|---|---|---|---|
| 2004/0146275 A1 | 7/2004 | Takata | |
| 2014/0282692 A1 | 9/2014 | Bhat | |
| 2016/0044374 A1 | 2/2016 | Ren | |
| 2018/0352280 A1* | 12/2018 | Lim | ...................... H04N 21/812 |
| 2019/0035431 A1 | 1/2019 | Attorre | |
| 2020/0213644 A1* | 7/2020 | Gupta | .............. H04N 21/25891 |
| 2021/0329352 A1* | 10/2021 | Thomas | ........... H04N 21/23424 |

FOREIGN PATENT DOCUMENTS

EP    3451683 A1    3/2019

OTHER PUBLICATIONS

Search Report for GB Patent Application No. 2013949.9 Mailing Date: Mar. 9, 2022 (4 pgs.).

* cited by examiner

*Primary Examiner* — Girumsew Wendmagegn
(74) *Attorney, Agent, or Firm* — Finch & Maloney PLLC

(57) ABSTRACT

A computer implemented method for editing a video file, the method comprising: loading the video file comprising a first scene followed by a second scene, the first scene having a first theme where the first scene meets the second scene and the second scene having a second theme where the second scene meets the first scene; detecting a transition point where the first scene ends and the second scene begins; selecting an intermediate scene from a library of intermediate scenes based on at least one of the first and second themes, the intermediate scene having at least one region onto which information can be overlaid; and inserting the selected intermediate scene between the first scene and second scene.

21 Claims, 2 Drawing Sheets

VIDEO EDITING

RELATED APPLICATIONS

This application claims priority under 35 U.S.C. § 119 to Great Britain Application No. 2013949.9, filed Sep. 4, 2020, and titled VIDEO EDITING, which is hereby incorporated herein by reference in its entirety.

BACKGROUND

This invention relates to a method for editing a video file.

SUMMARY

Videos are made with the intention of the videos being shown to audiences. They may be shown to audiences using a broadcast medium or may be made available to audiences to permit them to watch the video when they choose. Videos that are presented to an audience by some means may have information, either in the visual spectrum or as meta-data or other embedded information added to the videos prior to them being watched by the audience. This information may be overlaid on the existing video after production of the video. In this way, the information may not be present in the original video file but only added at a later stage. The video may have one or more regions that are suitable for the overlay of information. This information may be in the visual spectrum, auditory or other non-visual form. For instance, information may be included on a blank billboard or side of a van that forms part of the video. The information can be overlaid on to the blank billboard or side of a van.

The overlay of information on to an existing video is useful because it can provide information, which could be call-to-action prompts, that are relevant at the time the video is watched rather than being statically defined at the time the video was recorded.

Not all videos have regions that are suitable for the overlay of information. This may be because the videos are old and so where produced before it was identified that it would be useful to be able to overlay information on existing videos. This may also be because the videos captured content that did not lend itself to having regions which were suitable for the overlay of information.

It would therefore be desirable for there to be a method of editing videos to include regions which are suitable for the overlay of information.

According to a first aspect of the present invention there is provided a computer implemented method for editing a video file, the method comprising: loading the video file comprising a first scene followed by a second scene, the first scene having a first theme where the first scene meets the second scene and the second scene having a second theme where the second scene meets the first scene; detecting a transition point where the first scene ends and the second scene begins; selecting an intermediate scene from a library of intermediate scenes based on at least one of the first and second themes, the intermediate scene having at least one region onto which information can be overlaid; and inserting the selected intermediate scene between the first scene and second scene.

Loading the video file may comprise loading the video file from a storage location into a memory. Detecting the transition point may comprise using a transition point detection algorithm to locate the transition point, the transition point detection algorithm may output a location within the video file at which the first scene ends and the second scene begins.

The transition point detection algorithm may compare video within the video file to seed scenes to determine the transition point between the first scene and the second scene. The transition point detection algorithm may compare adjacent frames of the video file to determine the difference between those frames, and detects a transition point when the difference is above a threshold level. The location may be a time code within the video file.

The method may comprise detecting the first theme of the first scene and detecting the second theme of the second scene. Detecting the first theme and second theme may comprise using a theme detection algorithm to detect the first theme of the first scene and the second theme of the second scene. The theme detection algorithm may compare the first and second scenes to known seed scenes to determine the theme for each scene. The theme detection algorithm may use a correlation algorithm to compare known seed scenes to the first and second scene to determine the theme for each scene.

Each intermediate scene in the library of intermediate scenes may have a theme identifier, and selecting an intermediate scene may comprise selecting an intermediate scene using the theme identifier. Selecting an intermediate scene may comprise using a look-up table which correlates intermediate scenes to themes of scenes present in the video file. Selecting an intermediate scene may comprise selecting an intermediate scene from a library of intermediate scenes based on the first theme. Selecting an intermediate scene may comprise selecting an intermediate scene from a library of intermediate scenes based on the second theme. Selecting an intermediate scene may comprise selecting an intermediate scene from a library of intermediate scenes based on the first theme and the second theme. Selecting an intermediate scene may comprise selecting an intermediate scene from a library of intermediate scenes based on viewer data for the video file for targeting a subset of video viewers.

The information to be overlaid may be visual information. The information to be overlaid may be non-visual information. The non-visual information may be at least one of metadata or auditory information.

The method may comprise playing or streaming the edited video file to a viewer. The method may comprise overlaying information on to the at least one region during playing or streaming of the edited video file.

According to a second aspect of the present invention there is provided a server comprising a processor and a memory, the memory comprising software code which when executed by the processor causes the processor to undertake the methods as herein described.

BRIEF DESCRIPTION OF DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a computer implemented method for editing a video file. The method comprises loading the video file comprising a first scene followed by a second scene, the first scene having a first theme where the first scene meets the second scene and the second scene having a second theme where the second scene meets the first scene. The method further comprises detecting a transition point where the first scene ends and the second scene begins and selecting an intermediate scene from a library of intermediate scenes based on at least one of the first and second themes, the intermediate scene having at least one region onto which information can be overlaid. The method further comprises inserting the selected intermediate scene between the first scene and second scene.

Figure 1:
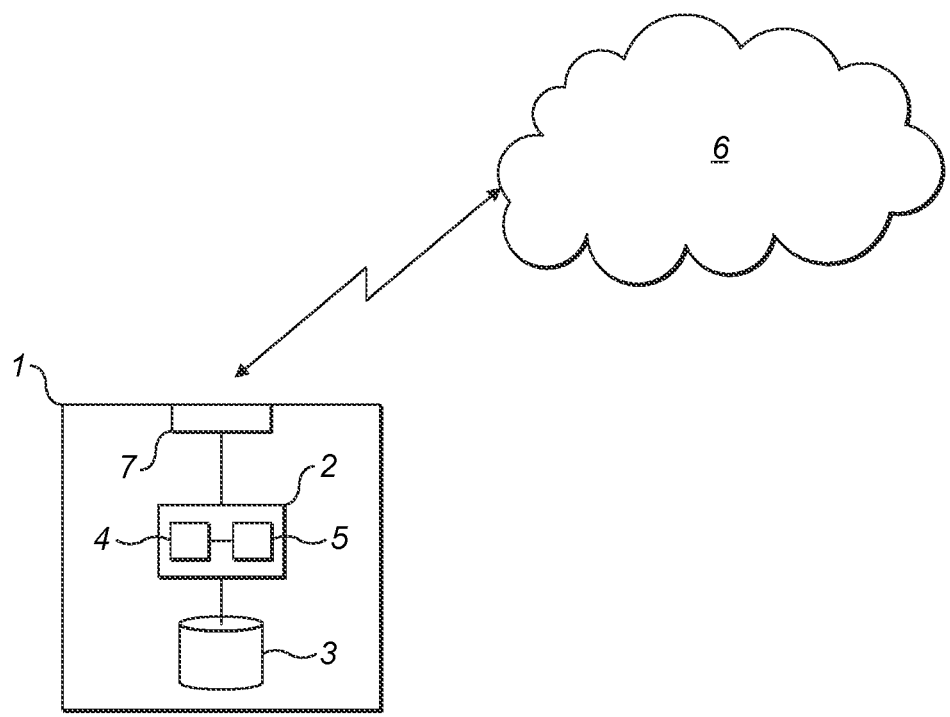
FIG. 1 shows a schematic diagram of a video editing server.

FIG. 1 shows an example system that can edit videos to include additional scenes with regions that are suitable for the overlay of information. The system comprises a server 1. It will be appreciated that whilst reference may be made to a single server 1, this server could be part of a cluster of servers or may be a virtual server running in a cloud-based, virtual environment. The server comprises a processing section 2 and a storage section 3. The server 1 is configured to implement methods described herein for processing video files and editing them to include additional scenes. These methods can be implemented and controlled by the processing section 2. The processing section 2 could perform its methods using dedicated hardware, using a general purpose processor executing software code, or a combination of the two. A processor 4 executes software code stored in a non-transient way in software memory 5 in order to perform its methods. The processing section can read/write data from/to storage location 3. The storage location 3 may be in the form of a memory. Storage location 3 may comprise non-volatile memory, may be in the form of an array of discrete banks of memory such has hard disks. Whilst shown in FIG. 1 as schematically being part of server 1, the storage location 3 may be separate to server 1 and connected to server 1. The video files herein described may be stored in storage location 3.

The server 1 may be connected to a computer network 6 to permit the transmission of video files. Computer network 6 may be made up of many network segments that are connected together and so may be a large distributed network such as the internet or another public network. The server 1 may be connected to the computer network 6 by one or more network interfaces 7. The server 1 may be connected to computer network 6 to permit communication between the server 1 and other computers. These other computers may store data that is used by server 1 to undertake the methods described herein.

Figure 2:
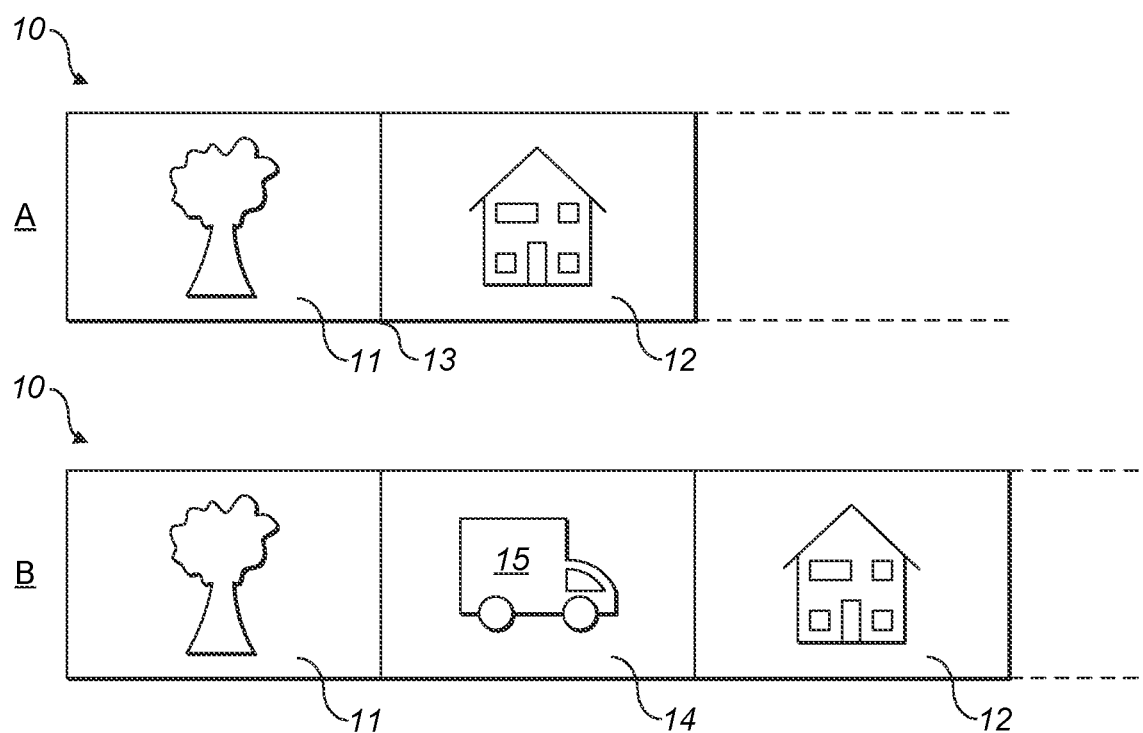
FIGS. 2A and 2B show illustrative diagrams of a video file before and after editing.

FIG. 2 shows two versions of a video file. FIG. 2A shows a video file 10. The video file 10 comprises a first scene 11. The video file also comprises a second scene 12. The second scene 12 follows the first scene 11. The video file 10 may comprise more than two scenes that follow each other one after the other in the video file. The video file 10 has a running length, when played at normal speed, and each of the scenes is part of the running length. In this way, each scene also has a running length. The running length of each scene may be different for each scene. Some of the running lengths of the scenes may be the same. All of the scenes comprised within the video file together form the total running length of the video file.

Each scene forms a logical part of the video contained within the video file. The scene is a portion of the video present in the video file. The video, and thus each scene, may present pictures together with audio. A scene may show a particular location or have a particular theme that is distinct from the scenes to one or both sides of the scene. In this way, each scene may have a particular theme. These themes may repeat in scenes present in the video file but adjacent scenes may have a different theme. As shown in FIG. 2, the first scene 11 has a countryside theme and the second scene 12 has a town theme. Some of the scenes in the video file may present information to the user such as the title and credits for the content contained within the video file. Other scenes, generally those in the middle of the video file, form the main content of the video.

The moment at which the first scene finishes and the second scene begins is a transition point 13. This is the point at which there is a change, usually abrupt, between one section of the video when it is being played and another section. Each section of the video being one scene of the video file 10. The transition point 13 is generally visually apparent because of the change in the theme of one scene to the next. In this way, the content of the scenes neighbouring each other have a distinct change in the content of the video present in the scenes.

FIG. 2B shows the video file 10 after the herein described method for editing the video file has been used. In this case, the video file 10 comprises the first scene 11. The video file 10 now comprises an intermediate scene 14 which follows the first scene 11. The video file 10 comprises a second scene 12 which now follows the intermediate scene 14. The intermediate scene 14 has been inserted at the transition point 13 between the first scene 11 and the second scene 12.

The intermediate scene 14 comprises at least one region 15 on to which information can be overlaid. The region 15 may be present for only part of the length of the intermediate scene. As shown in FIG. 2B the region 15 is the side of a van. The van may be white to give most options for the overlay of information on to the region 15. The region 15 may be non-static within the intermediate scene 14. The region 15 may move within the intermediate scene 14. For the example given in FIG. 2B, the van may be driving along a road and so move across the scene 14 and so not static within the scene 14.

The intermediate scene 14 may be selected based on the themes of the first scene 11 and the second scene 12. This is important so that a viewer of the whole video file does not feel that the inclusion of the intermediate scene 14 is jarring and/or non-sensical based on what is present in the first and second scenes 11, 12. The intermediate scene 14 may serve as a link between the theme of the first scene and the theme of the second scene. In the example shown in FIG. 2B, the van shown in the intermediate scene 14 may be driving between the country and a town. This thus links the themes of the first and second scenes together. The inclusion of the intermediate scene 14 is advantageous because it permits the inclusion of a region on to which information can be overlaid in a video file that might not otherwise have such a region. By choosing the particular intermediate scene 14 that links the first and second scenes together the inclusion of the intermediate scene 14 with the region 15 is imperceptible to a viewer of the edited video file 10.

The intermediate scene 14 may be inserted such that the total running length of the video file 10 is increased by the length of the intermediate scene 14. Alternatively, there may be portions of the video file that can be removed to permit the addition of the intermediate scene 14 whilst keeping the total running length of the video file 10 the same and/or there may be portions of the video file that can have the running speed of the portion of the video file increased without the viewer perceiving that speed increase as odd or distracting. For instance, the credits portion of the video file may have the running speed increased without the viewer perceiving that speed increase as odd or there may be portions of the video file that are included to set the scene of the video file but are not required to understand the content of the video file which may be removed.

Figure 3:
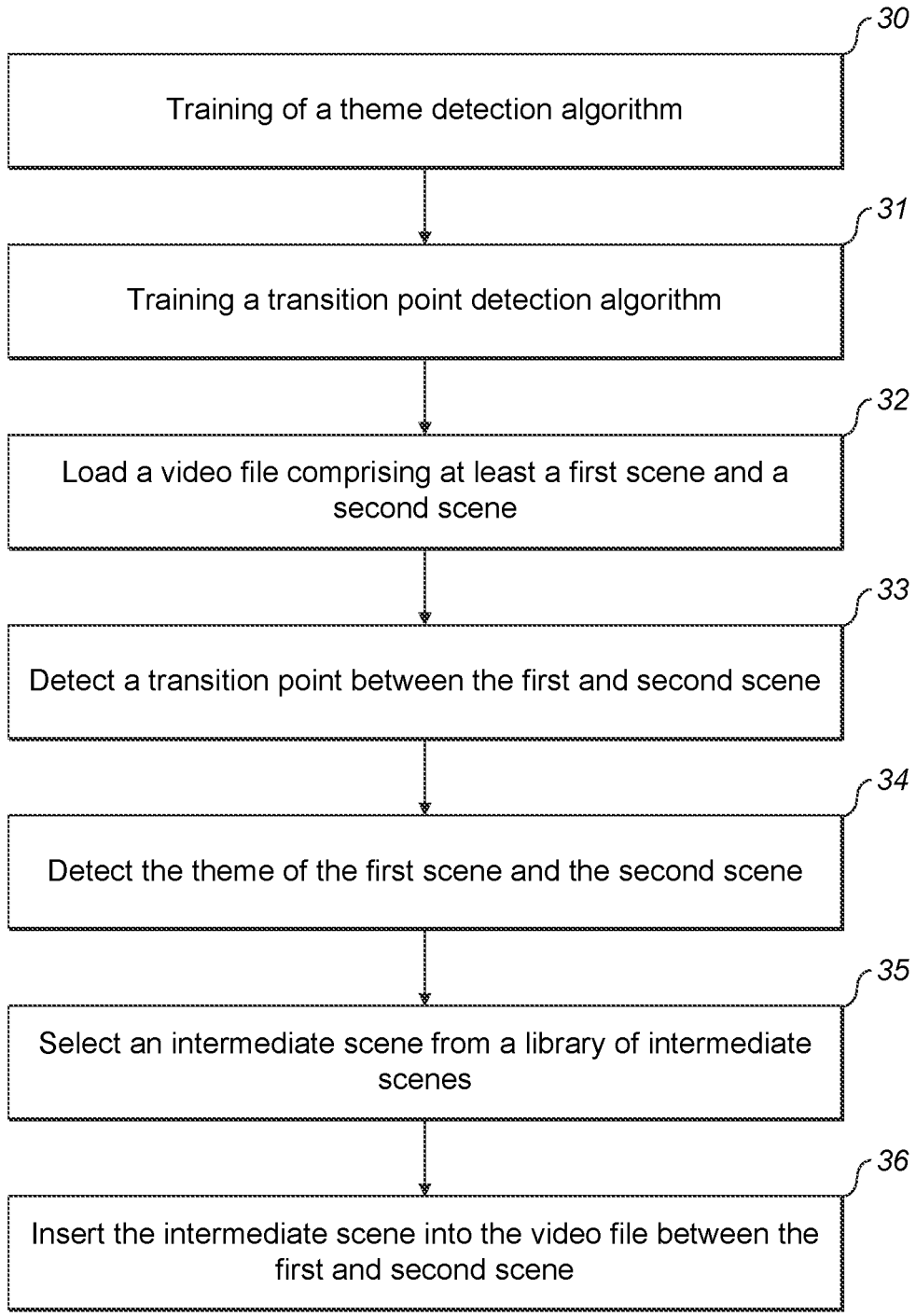
FIG. 3 shows a flow diagram describing the video editing process.

FIG. 3 shows a flow chart of steps that may be implemented by the server 1. The server 1 implements these steps using processing section 2 as described herein. FIG. 3 shows the method by which a video file 10 may be edited to include an intermediate scene 14.

As shown in step 30, a training step may be undertaken to train a theme detection algorithm. This may involve seeding the theme detection algorithm with a plurality of scenes with known themes. These seed scenes may be stored in storage location 3 and used to build the theme detection algorithm so that those known themes of the scenes can be compared to the detected scenes in later steps to determine the theme of the first and second scenes. The detection algorithm may use a correlation algorithm to compare the known scenes to the scenes present in the video file to determine the theme of the scenes.

Training step 30 may be run once when the server 1 is set up to implement the video editing method. Alternatively, training step 30 may be run on a periodic basis when new scenes with known themes are loaded into the storage location 3.

As shown in step 31, a training step may be undertaken to train a transition point detection algorithm. This may involve seeding the transition point detection algorithm with a plurality of scenes with the beginning and end of the scenes being marked. The seed scenes may be different to or the same as the seed scenes used for step 30. The detection algorithm may use a correlation algorithm to compare the beginning and ends of scenes of the seed scenes with those scenes present in the video file to determine the location of the transition point.

The transition point detection algorithm may be programmed to detect a level of difference between one frame of a video file and the next frame of a video file. If the difference between the two adjacent frames is above a threshold level then the transition point detection algorithm flags that a transition point from one scene to another has taken place at that point within the video file. The transition point detection algorithm may load a video file script for the video file. The video file script describes what is happening during the video file. The transition point detection algorithm may use the video file script to detect the transition point from one scene to another. The transition point detection algorithm may use the seeding, the threshold level, and/or the video file script. In this case, the transition point detection algorithm may flag a transition point if any of the conditions are met.

As for step 30, training step 31 may be run once when the server 1 is set up to implement the video editing method. Alternatively, training step 31 may be run on a periodic basis when new scenes are loaded into the storage location 3.

As shown in step 32, a video file 10 is loaded comprises at least a first scene and a second scene. The server 1 may load the video file 10 from the storage location 3. The loading of the video file 10 may be that the whole of the video file 10 is loaded into memory within the server 1. Alternatively, the video file 10 may be loaded from the storage location 3 by streaming the video file 10. In this case, a part of the video file may be loaded into memory at any given moment and the portion of the video file 10 that is loaded into memory changes as the video file is processed by the server 1.

As discussed herein, the first scene has a first theme and the second scene has a second theme. If more than two scenes are present, then each scene has a respective theme. Some of the themes of the scenes may be the same but it is advantageous if at least some of the scenes have different themes to enable the insertion of an intermediate theme without being highly perceptible by a viewer. In addition, some scenes may repeat throughout the video file. For instance, the storyline in the video file may return repeatedly to the same locale, such as a kitchen. In this case, more than one intermediate scene with the same content may be able to be inserted into the video file 10.

As shown in step 33, a transition point is detected at the point where the first scene ends and the second scene begins. The transition point is detected using the transition point detection algorithm which is trained in step 31. The transition point detection algorithm outputs the location within the video file at which the first scene ends and the second scene begins. The location may be the time code within the video file at which the transition occurs.

As described with reference to step 31, the transition point detection algorithm may detect the presence of the transition point by running through the video file comparing the video contained within the video file to beginning and end of the seed scenes to determine the transition point between the first scene and the second scene. The transition point detection algorithm may instead, or as well as, determine whether the difference between two adjacent frames of the video in the video file is above a threshold level. The transition point detection algorithm flags the transition point in the video file between the first scene and the second scene.

As shown in step 34, the theme of the first scene and the theme of the second scene is detected. The first scene is to one side of the transition point and the second scene is to the other side of the transition point. The themes of the first and second scenes are determined using the theme detection algorithm. As described with reference to step 30, the theme detection algorithm may compare the scenes to the known themes to determine the themes of first and second scenes. The theme detection algorithm may use the correlation algorithm to compare the known scenes to the scenes present in the video file to determine the theme of the scenes.

As shown in step 35, an intermediate scene is selected from a library of intermediate scenes. The library of intermediate scenes may be stored in the storage location 3. Each intermediate scene has a theme associated with it. Each intermediate theme may be stored with an indication of the theme of the intermediate theme. Each intermediate theme may have an identification reference associated with it. A table may store a theme identifier against each identification reference. The intermediate scene may be selected based on the theme of the intermediate theme. The intermediate scene may be selected based on the theme of at least one of the first scene and the theme of the second scene. The intermediate scene may be selected based on the first scene. The intermediate scene may be selected based on the second scene.

The storage location 3 may store a look-up table which instructs which intermediate scene to use for a given theme for a scene present in the video file. The intermediate scene may be selected based on the theme of the first scene and the theme of the second scene. The storage location 3 may store a look-up table which instructs which intermediate scene to use for respective given themes of the first and second scenes present in the video file.

An optional part of step 35 is that the intermediate scene may be selected based on viewer data for the video file. The intermediate scene may be selected using the viewer data to target the theme of the intermediate scene to a subset of the viewers of the video file. Step 35 may comprise receiving viewer data associated with the video file, deriving a viewer theme that is suitable for a subset of the viewers contained in the viewer data and selecting an intermediate scene based on the viewer theme and the themes of at least one of the first and second themes. The storage location 3 may store a look-up table which instructs which intermediate scene to use for a given viewer theme. The storage location 3 may store a look-up table which instructs which intermediate scene to use for respective viewer themes. The look-up table may be multi-dimensional and include details of the viewer themes and the themes of the first and second scenes to indicate which intermediate scene to use.

As shown in step 36, the intermediate scene is inserted into the video file between the first scene and the second scene. The intermediate scene may be inserted so that there is no gap between the end of the first scene and the beginning of the intermediate scene. The intermediate scene may be inserted so that there is no gap between the end of the intermediate scene and the beginning of the second scene. In this way the video within the video file may run seamlessly between the first scene, intermediate scene and second scene. As discussed herein, the intermediate scene comprises at least one region onto which information can be overlaid.

As discussed herein, the intermediate scene 14 may be inserted such that the total running length of the video file 10 is increased by the length of the intermediate scene 14. Alternatively, there may be portions of the video file that can be removed to permit the addition of the intermediate scene 14 whilst keeping the total running length of the video file 10 the same and/or there may be portions of the video file that can have the running speed of the portion of the video file increased without the viewer perceiving that speed increase as odd or distracting. For instance, the credits portion of the video file may have the running speed increased without the viewer perceiving that speed increase as odd or there may be portions of the video file that are included to set the scene of the video file but are not required to understand the content of the video file which may be removed. Therefore, step 36 may also comprise detecting at least one region of the video file which can have the running speed altered and adjusting the running speed of that region(s) so that the total running length of the video file is unchanged. This has the advantage of preserving the correct total program duration whilst enabling the addition of extra content which is contextually relevant to the rest of the video file. Once the intermediate scene(s) have been inserted, the edited video file may be played or streamed to a viewer.

During playback or streaming of the edited video file, information can be overlaid on at least one region. The information may be:

Logos or other pictures. These pictures may be relevant to the content of the edited video. The pictures may relate to current brands or symbols.

Wording. The wording may be relevant to the content of the edited video. The wording may relate to current brands or current events.

Moving images, for instance some form of video. The moving images may be relevant to the content of the edited video. The moving images may relate to current brands or current events.

Out of band signalling. The out of band signalling may be an audio watermark. The audio watermark may be perceived by a viewer of the video file. The audio watermark may not be perceived by a viewer of the video file but can be read by a device playing the video file.

A combination of any of pictures, moving pictures, out of band signalling and words.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A computer implemented method for editing a video file, the method comprising:

loading the video file comprising a first scene followed by a second scene, the first scene having a first theme where the first scene meets the second scene and the second scene having a second theme where the second scene meets the first scene, the video file having a total running length;

detecting a transition point where the first scene ends and the second scene begins;

based on the detection of the transition point, detecting the first theme of the first scene to one side of the transition point and detecting the second theme of the second scene to another side of the transition point;

based on the detection of the transition point, selecting an intermediate scene from a library of intermediate scenes based on detection of at least one of the first or second themes, the intermediate scene having at least one region onto which information can be overlaid; and inserting the selected intermediate scene between the first scene and second scene, wherein inserting the selected intermediate scene between the first scene and second scene comprises detecting at least one region of the video file, the at least one region being different to the intermediate scene, which can have a running speed altered and adjusting the running speed of the at least one region so that the total running length of the video file is unchanged once the intermediate scene has been inserted.

2. The computer implemented method according to claim 1, wherein loading the video file comprises loading the video file from a storage location into a memory.

3. The computer implemented method according to claim 1, wherein detecting the transition point comprises using a transition point detection algorithm to locate the transition point, the transition point detection algorithm outputting a location within the video file at which the first scene ends and the second scene begins.

4. The computer implemented method according to claim 3, wherein the transition point detection algorithm compares video within the video file to seed scenes to determine the transition point between the first scene and the second scene.

5. The computer implemented method according to claim 3, wherein the transition point detection algorithm compares adjacent frames of the video file to determine a difference between those frames, and detects the transition point when the difference is above a threshold level.

6. The computer implemented method according to claim 3, wherein the location is a time code within the video file.

7. The computer implemented method according to claim 1, the method comprising detecting the first theme of the first scene and detecting the second theme of the second scene.

8. The computer implemented method according to claim 7, wherein detecting the first theme and second theme comprises using a theme detection algorithm to detect the first theme of the first scene and the second theme of the second scene.

9. The computer implemented method according to claim 8, wherein the theme detection algorithm compares the first and second scenes to known seed scenes to determine the theme for each scene.

10. The computer implemented method according to claim 8, wherein the theme detection algorithm uses a correlation algorithm to compare known seed scenes to the first and second scene to determine the theme for each scene.

11. The computer implemented method according to claim 1, wherein each intermediate scene in the library of intermediate scenes has a theme identifier, and selecting an intermediate scene comprises selecting an intermediate scene using the theme identifier.

12. The computer implemented method according to claim 1, wherein selecting an intermediate scene comprises using a look-up table which correlates intermediate scenes to themes of scenes present in the video file.

13. The computer implemented method according to claim 1, wherein selecting an intermediate scene comprises selecting an intermediate scene from a library of intermediate scenes based on the first theme.

14. The computer implemented method according to claim 1, wherein selecting an intermediate scene comprises selecting an intermediate scene from a library of intermediate scenes based on the second theme.

15. The computer implemented method according to claim 1, wherein selecting an intermediate scene comprises selecting an intermediate scene from a library of intermediate scenes based on the first theme and the second theme.

16. The computer implemented method according to claim 1, wherein selecting an intermediate scene comprises selecting an intermediate scene from a library of intermediate scenes based on viewer data for the video file for targeting a subset of video viewers.

17. The computer implemented method according to claim 1, wherein the information to be overlaid is visual information.

18. The computer implemented method according to claim 1, wherein the information to be overlaid is non-visual information.

19. The computer implemented method according to claim 18, wherein the non-visual information is at least one of metadata or auditory information.

20. A server comprising a processor and a memory, the memory comprising software code which when executed by the processor causes the processor to undertake the method of claim 1.

21. A computer implemented method for editing a video file, the method comprising:
loading the video file comprising a first scene followed by a second scene, the first scene having a first theme where the first scene meets the second scene and the second scene having a second theme where the second scene meets the first scene, the video file having a total running length;
detecting a transition point where the first scene ends and the second scene begins;
based on the detection of the transition point, selecting an intermediate scene from a library of intermediate scenes based on at least one of the first and second themes, the intermediate scene having at least one region onto which information can be overlaid; and
inserting the selected intermediate scene between the first scene and second scene, wherein inserting the selected intermediate scene between the first scene and second scene comprises detecting at least one region of the video file, the at least one region being different to the intermediate scene, which can have a running speed altered and adjusting the running speed of the at least one region so that the total running length of the video file is unchanged once the intermediate scene has been inserted.

* * * * *